(12) United States Patent
Dowidat-Eskes et al.

(10) Patent No.: US 7,964,053 B2
(45) Date of Patent: Jun. 21, 2011

(54) PATTERNED LINOLEUM SHEETING

(75) Inventors: Marco Dowidat-Eskes, Delmenhorst (DE); Guido Burmeister, Wildeshausen (DE); Jörg bzw. Joerg Nienaber, Hude (DE)

(73) Assignee: Armstrong DLW AG, Bietigheim-Gissingen (DE)

( * ) Notice: Subject to any disclaimer, the term of this patent is extended or adjusted under 35 U.S.C. 154(b) by 468 days.

(21) Appl. No.: 10/594,326

(22) PCT Filed: Mar. 29, 2005

(86) PCT No.: PCT/EP2005/003258
§ 371 (c)(1),
(2), (4) Date: Apr. 11, 2007

(87) PCT Pub. No.: WO2005/092590
PCT Pub. Date: Oct. 6, 2005

(65) Prior Publication Data
US 2007/0278709 A1 Dec. 6, 2007

(30) Foreign Application Priority Data
Mar. 29, 2004 (DE) .......................... 10 2004 015 257

(51) Int. Cl.
| | |
|---|---|
| B29C 47/00 | (2006.01) |
| B29C 65/00 | (2006.01) |
| B32B 37/00 | (2006.01) |
| B32B 38/04 | (2006.01) |
| C09J 5/02 | (2006.01) |
| C08J 5/00 | (2006.01) |
| B32B 5/16 | (2006.01) |

(52) U.S. Cl. ............... 156/264; 156/244.18; 156/244.24; 156/269; 156/307.3; 156/307.7; 428/324; 428/328

(58) Field of Classification Search .................... 156/63, 156/242, 244.11, 244.12, 244.18, 244.19, 156/244.24, 244.25, 250, 256, 259, 260, 156/264, 265, 269, 270, 271, 276, 293, 297, 156/298, 299, 300, 301, 302, 303; 264/73, 264/74, 75, 76, 113; 428/324, 326, 327, 428/328, 332, 339
See application file for complete search history.

(56) References Cited

U.S. PATENT DOCUMENTS
1,691,708 A * 11/1928 Egleson ....................... 428/163
(Continued)

FOREIGN PATENT DOCUMENTS
DE 38 43 482 A1 6/1990
(Continued)

OTHER PUBLICATIONS

Andreas Giessmann, "Substrat- und Textilbeschichtung: Praxiswissen für Textil-, Bekleidungs- und Beschichtungsbetriebe", Springer, 2003, S. 93-94. ISBN: 3-540-43426-7.

(Continued)

Primary Examiner — Philip C Tucker
Assistant Examiner — Brian R Slawski
(74) Attorney, Agent, or Firm — Sughrue Mion, PLLC

(57) ABSTRACT

The invention relates to a method for the production of a patterned linoleum sheet, comprising the steps: a) application of a non-linoleum material to at least a part of the surface of a green linoleum and/or introduction of a non-linoleum material into given recesses in the green linoleum, or a') application of a non-linoleum material in the form of a solution, a paste, a suspension or a dispersion onto the scraped linoleum mixture and calendering of the scraped linoleum mixture provided with the non-linoleum material to give a green linoleum, b) cutting the green linoleum thus obtained into pieces of given length, c) overlaying the cut green linoleum pieces to give a tiled stack of sheets and d) calendering the tiled stack of sheets to give a patterned linoleum sheet. The invention further relates to a patterned linoleum sheet obtained by said method and the use thereof.

23 Claims, 8 Drawing Sheets

U.S. PATENT DOCUMENTS

| | | | |
|---|---|---|---|
| 1,873,587 A * | 8/1932 | Humphreys et al. | 427/205 |
| 2,775,994 A | 1/1957 | Rowe | |
| 2,986,198 A | 5/1961 | Kolker et al. | |
| 3,194,859 A | 7/1965 | Wacker | |
| 4,429,461 A * | 2/1984 | Glavic | 30/289 |
| 5,217,554 A * | 6/1993 | Stroppiana | 156/153 |
| 7,297,366 B1 * | 11/2007 | Markmann et al. | 427/180 |
| 2002/0020128 A1 * | 2/2002 | Schwonke et al. | 52/403.1 |

FOREIGN PATENT DOCUMENTS

| | | |
|---|---|---|
| DE | 691 07 205 T2 | 8/1995 |
| DE | 199 14 183 A1 | 10/2000 |
| DE | 199 15 868 * | 10/2000 |
| DE | 199 15 868 A1 * | 10/2000 |
| DE | 199 48 406 A1 | 4/2001 |
| DE | 199 15 868 C2 | 6/2002 |
| DE | 101 17 922 C1 | 2/2003 |
| EP | 0 528 059 A1 | 2/1993 |
| EP | 1 176 247 A | 1/2002 |

OTHER PUBLICATIONS

Saechtling, Hansjürgen: Kunststoff-Taschenbuch. 25. Ausg. München [u.a.]: Hanser, 1992, S. 58-60. ISBN: 3-446-16498-7.

Forster, Gunther, Eiffler, Josef, Buchholz, Uwe: Linoleum: Landsberg/Lech: Verlag Moderne Industrie, 1995 (Die Bibliothek der Technik; Bd 109), S.23. ISBN 3-478-93123-1.

* cited by examiner

↑ Calendering direction of the stack of sheets

↑ Calendering direction of the stack of sheets

↑ Calendering direction of the stack of sheets

↑ Calendering direction of the stack of sheets

↑ Calendering direction of the stack of sheets

PATTERNED LINOLEUM SHEETING

BACKGROUND OF THE INVENTION

The present invention relates to a patterned linoleum sheeting having a novel surface design, a method for producing same and use of same as a floor covering, tiles, wall covering or decorative covering.

Linoleum floor coverings have been produced for many years in various color and designs. To produce a surface pattern in a linoleum floor covering, there is a known method in which pigmented polymer flakes and/or flocks are homogeneously incorporated into the linoleum mixture to produce a green linoleum and/or a linoleum sheeting. Furthermore, it is known in the state of the art that colored linoleum mixture particles may be pressed into the surface layer of green linoleum and the stacks of sheets produced by superimposing the green linoleum sheets are then calendered. However, the type of surface design that can be produced by the preceding methods is subject to relatively great restrictions with regard to the patterning that can be produced.

SUMMARY OF THE INVENTION

Thus, the object of the present invention is to provide a linoleum sheeting having a novel surface design and a method for producing same.

This object is achieved through the embodiments characterized in the claims.

In particular, the present invention provides a method for producing a patterned linoleum sheeting, comprising the steps:
(a) Applying a flat layer of a non-linoleum material to at least part of the surface of a green linoleum and/or introducing a non-linoleum material into predetermined recesses in the green linoleum,
(b) Cutting the resulting green linoleum into pieces of a predetermined length,
(c) Layering the cut green linoleum pieces one above the other to form a tiled sheet package and
(d) Rolling out the tiled package to form a patterned linoleum sheeting.

An alternative method for producing a patterned linoleum sheeting according to the present invention consists of
(a') Applying a non-linoleum material in the form of a solution, paste, suspension, powder, granules or dispersion to the scraped linoleum mixture (i.e., before calendering the green linoleum) and calendering the scraped linoleum mixture furnished with the non-linoleum material to yield a green linoleum,
(b) Cutting the resulting green linoleum into pieces of a predetermined length,
(c) Layering the cut green linoleum pieces to form a tiled stack of sheets, and
(d) Calendering the tiled stack of sheets to form a patterned linoleum sheeting.

After step (a'), a flat layer of a non-linoleum material may also be applied to at least part of the surface of this green linoleum, as described above, and/or a non-linoleum material may be introduced into predetermined recesses in this green linoleum, whereby further processing may be performed by a similar method as described above and below.

Furthermore, the non-linoleum material may be applied entirely or partially to the stack of sheets of green linoleum prior to calendering in addition to or instead of applying the non-linoleum material to the surface and/or introducing it into the predetermined recesses.

The term scraped linoleum mixture as used according to the present invention is understood to refer to a linoleum mixture, i.e., a batch of the usual raw materials used for the production of linoleum, mixed as homogeneously possible, these raw materials being in the form of an irregularly shaped material, usually coarsely granular and spread out on a conveyor belt, for example, and sent to a rolling device such as a calender. The non-linoleum material is applied to the scraped linoleum mixture as a function of the properties of the non-linoleum material to be applied by means of the usual methods known in the field, the preferred method being to spray a solution or a suspension containing the non-linoleum material onto the linoleum.

A non-linoleum material as used according to the present invention is understood to refer to a material that is solid (e.g., powdered), liquid, dissolved, suspended or dispersed and is different from the raw materials used for the production of the linoleum mixture, e.g., Bedford cement (binder), sawdust, cork powder, chalk, fillers, siccative (ripening agent), and optionally conventional processing additives. The non-linoleum material is not fundamentally subject to any particular restrictions. For example, it may be used in the form of a powder, granules, paste, suspension and/or solution. The non-linoleum material preferably differs from the materials used in the linoleum mixture, such as the pigments optionally used therein.

According to an alternative embodiment, the non-linoleum material may also be in the form of an at least partial coating on a particulate material, which is produced from linoleum mixture or a polymer that is preferably compatible with linoleum. The particulate material is preferably in the form of granules.

The non-linoleum material is preferably a metallic material and/or a pigment that differs from the pigment(s) optionally used for coloring the linoleum mixture. When a pigment is used as the non-linoleum material, at least its color will differ from that of a pigment used for pigmenting the linoleum mixture. The term "metallic material" and/or "pigment" is to be understood in the sense of the present invention to refer to both a metal and/or a pigment itself and to materials containing metal and/or pigment, e.g., pastes, solutions or suspensions.

Suitable metallic materials include metal powder or metal pastes such as aluminum powder, aluminum powder in aqueous suspensions or dispersions, aluminum powder in aqueous or solvent-based paints or UV curing paints.

Suitable pigments include organic and inorganic colored pigments which differ from the colored pigments optionally used for coloring the linoleum mixture at least in their hue and/or their depth of color.

The inorganic pigments that may be used are not subject to any particular restrictions. In general, inorganic pigments are understood to be pigments based on oxides and oxide hydroxides or sulfides or sulfoselenides, chromate pigments and chromium-containing pigments, ultramarine pigments and iron blue pigments (see *Ullmann's Encyclopedia of Industrial Chemistry*, 4<sup>th</sup> edition, vol. 18, pp. 599 to 645).

DETAILED DESCRIPTION OF THE INVENTION

Figure 1:
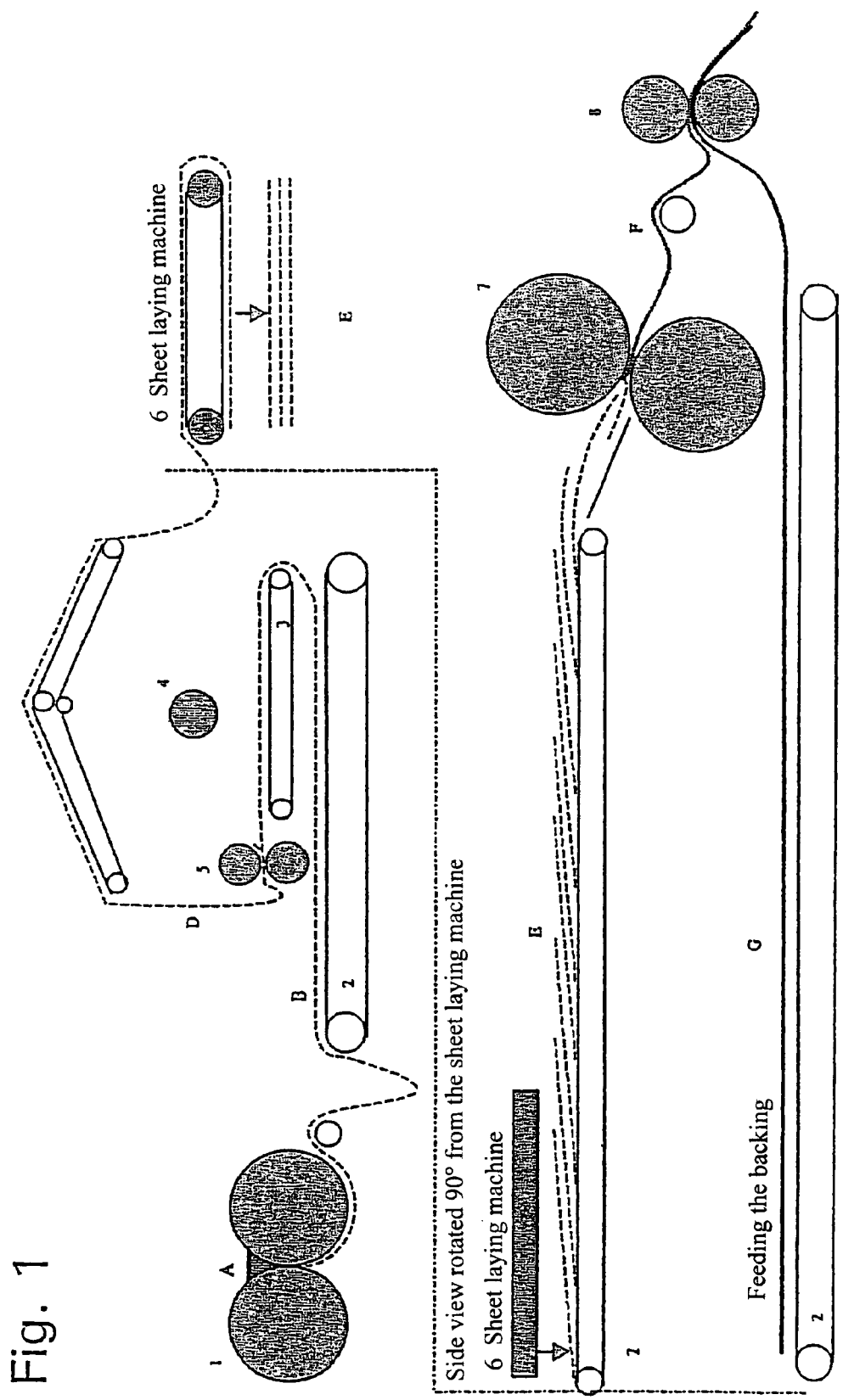
FIG. 1 shows a schematic view of a device for implementing a preferred embodiment of the inventive method.

Suitable organic pigments are fundamentally not subject to any particular restrictions. Organic pigments include, for example, azo pigments, metal complex pigments, isoindoline pigments, phthalocyanine pigments, quinacridine pigments, perinone pigments, perylene pigments, anthraquinone pigments, thioindole pigments, dioxazine pigments, triphenylmethane pigments, quinophthalone pigments or fluorescent pigments (see *Ullmann's Encyclopedia of Industrial Chemistry*, 4th edition, vol. 18, pp. 661 to 695).

A preferred group of pigments that may be used in the present invention include effect pigments or luster pigments (see, for example, *Ullmann's Encyclopedia of Industrial Chemistry*, 4th edition, vol. 18, pp. 629 to 634). An effect pigment is generally understood to be a colored pigment which gives a different color impression when observed from different angles of viewing. Furthermore, according to the present invention, effect pigments are understood to include fluorescent or phosphorescent pigments. Preferred effect pigments include, for example, effect pigments such as mica and/or mica minerals or polyester-mica.

Examples of luster pigments include metal effect pigments such as aluminum pigments or copper and gold-bronze pigments or pearlescent effect pigments.

The non-linoleum material is especially preferably an aluminum powder, an aluminum paste or an effect pigment based on mica or mica minerals or polyester-mica, optionally with a substrate material based on cellulose.

The non-linoleum material is applied to the green linoleum by the usual application techniques, including doctor application, spray or brush application, etc., depending on its properties and/or state of matter. Those skilled in the art will be thoroughly familiar with suitable application techniques and will select the suitable application technique accordingly in each case as a function of the properties of the non-linoleum material.

A flat layer is understood according to the present invention to refer to a layer of a powder, granules, paste, suspension and/or solution covering the surface of the green linoleum essentially uniformly, i.e., continuously, and containing the non-linoleum material. The flat layer of a non-linoleum material is preferably applied to the side of the green linoleum forming the side facing the observer in the resulting linoleum sheeting; for example, this will be the wear layer in the case of a linoleum floor covering or a linoleum tile or the patterned layer of a wall covering or a decorative floor covering based on linoleum. The flat layer is designed so that it forms a continuous layer that essentially provides complete coverage when observed with the naked eye, so that the surface of the green linoleum and/or the coated part thereof preferably no longer shines through. The flat layer is preferably not applied according to the present invention in such a way that wide areas of the surface of the green linoleum remain uncovered.

The non-linoleum material is preferably applied as a flat layer to the surface of the green linoleum and/or introduced into predetermined recesses in the green linoleum. In doing so, the flat coating may be applied over the entire width or only a portion of the width of the green linoleum. This situation is also similar for the aforementioned recesses into which the non-linoleum material is introduced, i.e., these recesses may be arranged over the entire width of the green linoleum over only a part thereof at regular or irregular predetermined intervals.

The thickness of the flat layer applied to the green linoleum should be in a range of 5 µm to 1000 µm. The thickness of the flat layer is preferably in a range of 10 µm to 200 µm, especially preferably from 30 µm to 100 µm and most preferably from 30 µm to 80 µm.

The recesses optionally provided in the green linoleum are not subject to any particular restrictions in general with regard to their shape. For example, they may have the shape of grooves, predetermined patterns or decorative patterns. The recesses in the green linoleum may have a depth in the range of 5% to 60%, based on the thickness of the green linoleum, a depth of 10% to 30% being preferred.

The recesses preferably have a continuous or interrupted linear or meandering groove shape or strip shape or dot shape, which may be formed by scraping or embossing or dotting the green linoleum, for example. The predetermined recesses are preferably filled completely with the non-linoleum material so as to form a flush, i.e., planar surface without elevations and recesses. If there are grooves, the groove spacing should amount to between approximately 0.1 mm and approximately 10 cm, preferably between 0.2 mm and 2 cm, depending on the desired design. The width of the grooves is approximately 0.2 mm to approximately 1 cm, preferably approximately 0.3 mm to approximately 2 mm.

The recesses are introduced into the surface side of the green linoleum, pointing toward the surface side of the stack of sheets and forming the wear layer or pattern layer after calendering the stack of sheets.

As an alternative to step (a) and/or step (a') in the inventive method described above, single-color or multicolor linoleum mixture particles or polymer particles at least partially coated with a non-linoleum material, e.g., in the form of granules on at least one side of a single-color or multicolor green linoleum (as described in DE 199 15 868 C2), may also be dispersed and pressed into the green linoleum in an essentially deformation-free manner.

Another alternative to the production of the inventive patterned linoleum sheeting is described below.

First, a green linoleum, optionally pigmented in one or more colors, is rolled out in the usual way, e.g., by using a calender. Then the green linoleum is coated, at least over the surface, with the non-linoleum material, preferably in the form of a solution, paste, suspension or dispersion, in the calendering direction, i.e., in the direction of conveyance, in the usual way, preferably by doctor application. The green linoleum coated in this way may be processed directly to form granules or chips or may be cut into halves, each half preferably being of the same size, in the calendering direction, or it may be folded once or several times in the calendering direction and then the stacked sections of green linoleum and/or folded green linoleum are processed to yield granules or chips. This yields specially pigmented granular particles or chips having the coloration of the corresponding non-linoleum material applied in a thin layer as well as the color(s) of the linoleum mixture used. These granular particles or chips are then rolled out with a calendar, for example, to form a linoleum sheet which can be processed further in the usual way. As an alternative, the non-linoleum material may be applied to the scraped linoleum mixture prior to the first calendering in the procedure described above, whereby it is preferable in this case for a solution of non-linoleum material to be sprayed onto the linoleum mixture and/or for a powder to be distributed on it. However, the non-linoleum material may also be applied in the form of a paste, suspension or dispersion. Then the resulting green linoleum may be processed to granules or chips with or without additional application of a flat layer that is at least partially applied as described above to form granules or chips and then rolled out to form a linoleum sheet. Next, as described above, a flat layer of a non-linoleum material, which may be the same as or different from the non-linoleum material used above, may then be applied to at least a portion of the surface of this green linoleum and/or introduced into certain recesses in this green linoleum, whereby further processing may be performed by a similar method as described above.

Accordingly, a method for producing a patterned linoleum sheeting of the type described above comprises the following steps:

Producing a single-color or multicolor green linoleum from linoleum mixture,

Coating a single-color or multicolor green linoleum on at least a portion of its surface using a non-linoleum material, Processing the coated green linoleum to yield granules or chips either directly or after either being cut into preferably halves of equal size in the calendering direction and then laying the sections one above the other or after the green linoleum has been folded once or more, Producing a linoleum sheet from the resulting granular particles or chips by calendering same and optionally Further processing the resulting linoleum sheet in the usual manner or in the inventive manner as described here to yield a final linoleum sheeting.

In another embodiment of this method, a non-linoleum material is already applied in the form of a solution, paste, suspension or dispersion to the scraped linoleum mixture (i.e., prior to calendering the green linoleum) and the scraped linoleum mixture produced with the non-linoleum material is calendered to form a green linoleum. The green linoleum coated in this way may be processed directly to yield granules or chips or it may be cut into halves, preferably of the same size, in the calendering direction or be folded once or more and then the sections of green linoleum layered one above the other and/or the folded green linoleum is processed to yield granules or chips. The resulting granular particles or chips are used to produce a linoleum sheeting by calendering same and the resulting linoleum sheet is optionally processed further in the usual way to form a final linoleum sheeting.

Following the step of applying a non-linoleum material in the form of a solution, paste, suspension or dispersion to the scraped linoleum mixture and calendering the scraped linoleum mixture furnished with the non-linoleum material to yield a green linoleum, the single-color or multicolor green linoleum may additionally be coated with a non-linoleum material as described above on at least a portion of its surface, whereby further processing may be performed in a manner similar to that described above.

Green linoleum is understood according to the present patent application to refer to a single-color or multicolor calendered sheet of the conventional raw materials used to produce linoleum such as Bedford cement (i.e., a mixture of partially oxidized linseed oil and natural resin such as colophony), sawdust, cork powder, chalk, fillers, such as titanium dioxide, pigments, graphite, siccative (ripening accelerator) and optionally conventional process additives. The green linoleum may be produced in a known way with a single-color, veined or dotted surface patterning (e.g., according to the method claimed in DE 199 15 868 C2).

According to a preferred embodiment, a non-linoleum material may preferably be in the form of a powder, bound in a polymer binder. Those skilled in the art are familiar with suitable polymer binders, but it is preferable to use a hot-melt material (in particular based on polyamide) or other fusible thermoplastic polymers and/or copolymers such as PET, PP, PE or EVA or polymers of renewable raw materials such as polylactic acid, thermoplastic starch or other carbohydrates.

Figure 8:
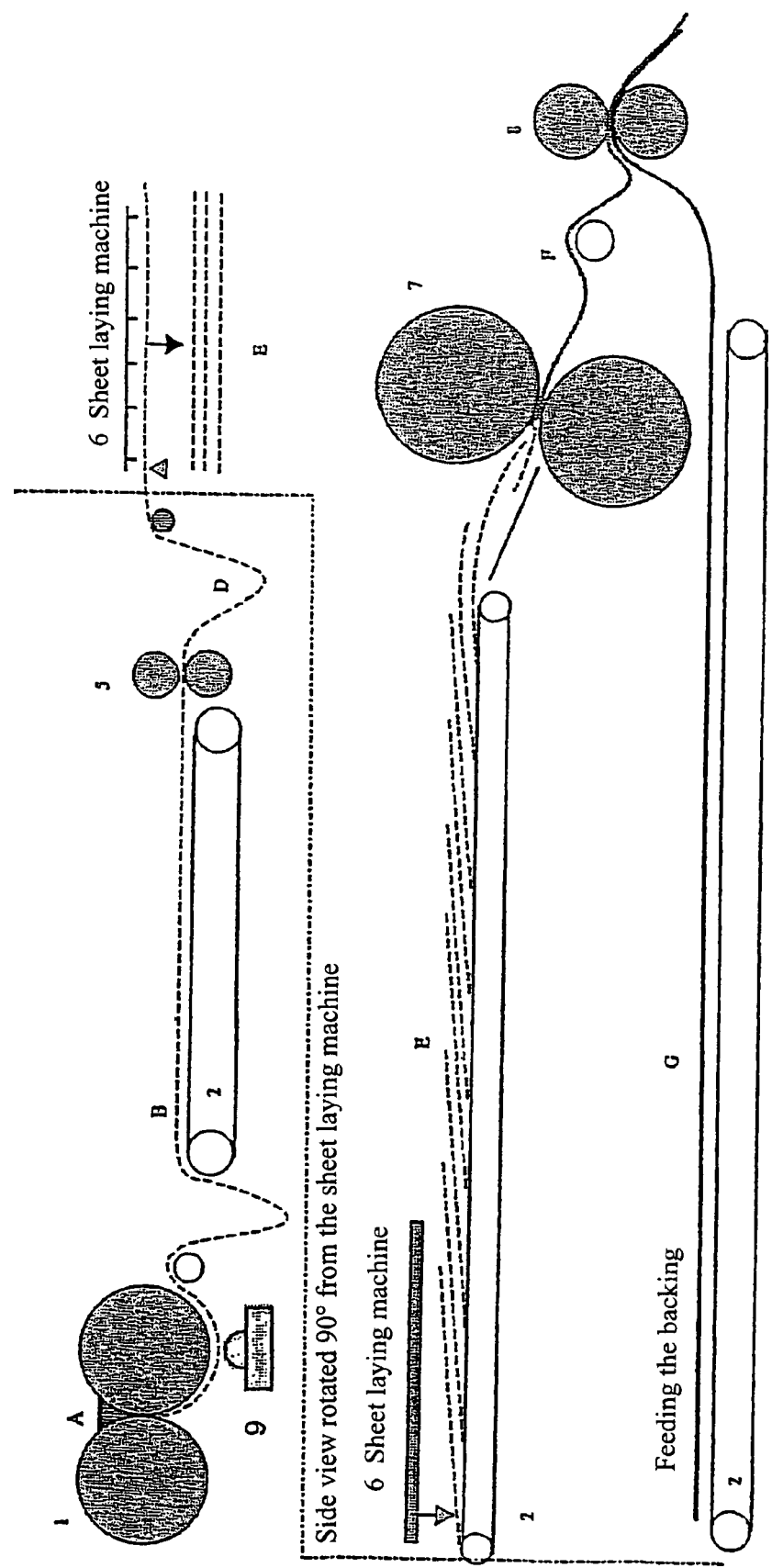
FIG. 8 shows a schematic view of a device for implementing another preferred embodiment of the inventive method.

The non-linoleum material containing a polymer binder, preferably a hot-melt material, is applied to the green linoleum. It is applied in particular by a hot-melt coater which is located preferably beneath the cold roller of the sheet calender, as illustrated in FIG. 8. Other conventional application techniques such as spraying, doctor application, etc. may also be used.

Furthermore, it is possible to coat the green linoleum with the hot-melt material at all the application sites specified in the present patent application. It is possible to coat the entire width of the green linoleum as well as just a part thereof.

The temperature of the hot melt depends on the type of polymer or polymer blend used and is preferably in a range from approximately 40° C. to approximately 250° C.

By using the procedure described above, it is possible to minimize the use of non-linoleum material while at the same time retaining the characteristic properties of the product. This makes it possible in particular to achieve an excellent abrasion resistance of the non-linoleum material in the overall structure.

Through the choice and design of the applicator tool such as an applicator roller and its surface properties or the type of spray application as well as the treatment of the green linoleum, e.g., with predetermined recesses, it is possible to produce various surface designs and/or appearances of the finished linoleum sheeting.

Figure 2:
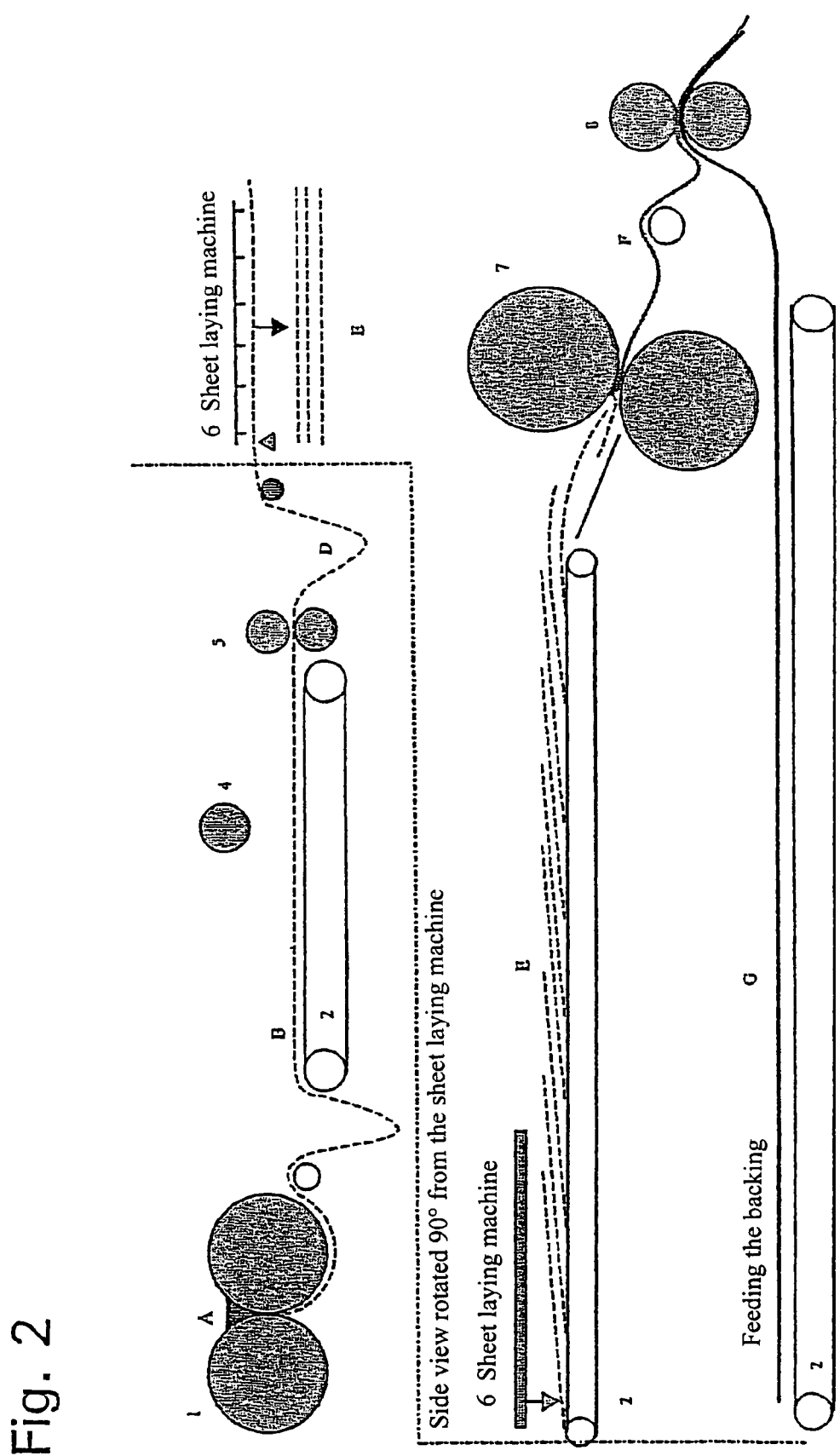
FIG. 2 shows a schematic view of the device for implementing another preferred embodiment of the inventive method.

Preferred embodiments of the inventive method are illustrated in FIGS. 1 and 2, which show that a green linoleum that usually has a width of approximately 0.5 meter to approximately 2.5 meters and a thickness in the range of approximately 0.5 mm to approximately 5 mm and is cut into pieces of a suitable length, preferably a length corresponding to the intended width of the linoleum sheeting being produced, i.e., approximately 1 meter to 2.5 meters, can then be laid by a sheet laying machine to form a tiled stack of sheets. The pieces are preferably laid in such a way that the original longitudinal direction of the green linoleum comes to lie across the direction of transport of the tiled stack of sheets, preferably 90° to the direction of transport. Then the stack of sheets may be rolled out, e.g., by using a calender, to yield the desired thickness, preferably 1 mm to 5 mm, to form the patterned linoleum sheeting.

FIG. 1 shows a schematic view of a device for implementing a preferred embodiment of the inventive method. A sheet is calendered in a sheet roll mill 1 from the prefabricated single-color or multicolor linoleum mixture A. Depending on the mixture A, the result is a single-color and/or veined linoleum sheet B. The linoleum sheet B is conveyed over a first conveyor belt 2 to a second conveyor belt 3, where the non-linoleum material is applied to the linoleum sheet B by means of an applicator device 4. The linoleum sheet D furnished in this way is then guided to the sheet laying machine 6, divided into pieces approximately 2 meters long and layered to form a tiled stack of sheets E. The stack of sheets E is then placed on another conveyor belt, so that the coated side in the stack of sheets E is facing upward. This conveyor carries the stack of sheets E to the sheet calender 7, where the coated linoleum sheet side is facing the cold patterning roller. In the sheet calender 7, the stack of sheets E is rolled out to the desired thickness to form structured sheet F (wear layer and/or patterned layer) and bonded to the backing G in a doubling roller 8.

FIG. 2 shows a schematic view of the device for implementing another preferred embodiment of the inventive method. In the embodiment illustrated in FIG. 1, the back side of the linoleum sheet B is furnished with the non-linoleum material, but in this embodiment, the non-linoleum material is applied directly to the front side of the linoleum sheet B.

FIGS. 3 through 6 show patterned linoleum sheeting that can be produced by the inventive method.

According to the inventive method, it is possible for the non-linoleum material to be applied to the entire surface of the green linoleum or to only a portion thereof. Likewise, the recesses to be filled with the non-linoleum material, e.g., grooves may be arranged over the entire width of the green linoleum as seen in the calendering direction or over only a portion of its width.

If the green linoleum is coated with the non-linoleum material on only half of the surface, for example, and the green linoleum coated on half its surface is cut into pieces, the length of which corresponds approximately to the width of the green linoleum, and these pieces are rotated 90° and stacked by a sheet-laying machine to form a stack of sheets, this stack of sheets is sent to the calender so that the coated halves of the green linoleum pieces are facing the calender, the result is a linoleum sheet in which the non-linoleum material appears as a pattern essentially only at the surface and/or in a layer near the surface. In deeper layers of the green linoleum, there is practically no non-linoleum material accordingly. Therefore, the amount of expensive non-linoleum material can be reduced, for example, thereby lowering costs.

In general, the answer to the question of whether the non-linoleum material is present over the entire cross section or over only a portion thereof in the finished linoleum sheeting and/or the top layer thereof depends on whether or not the green linoleum has been coated with non-linoleum material over its entire surface width. If the green linoleum has been coated with the non-linoleum material over the entire width of its surface, the green linoleum has then been subdivided into sections and these sections have been calendered in the form of a stack of sheets consisting of the sections stacked one above the other, then the non-linoleum material is distributed over the entire cross section of the top layer and/or the linoleum sheeting, namely essentially in a layered structure running obliquely. However, if the green linoleum has been coated with the non-linoleum material in the calendering direction, for example, over only half its width, and the green linoleum has been processed further in the same manner as described above, then the layer structure running obliquely is also to be found over the cross section of the top layer and/or the linoleum sheeting but only to approximately half of the thickness of this top layer and/or the linoleum sheeting.

If, on the other hand, the non-linoleum material has already been added proportionately to the linoleum mixture and this linoleum mixture has then been calendered, i.e., rolled out to form a green linoleum, then the non-linoleum material is distributed more or less homogeneously over the entire cross section of the top layer of the finished linoleum sheeting, depending on how homogeneously the linoleum mixture and the non-linoleum material have been blended together prior to calendering.

The non-linoleum patterning material is incorporated into the surface of the linoleum floor covering so that it is flush with the surface by means of calendering, thereby ensuring a permanent, abrasion resistant and wear resistant design. This effect is reinforced by the procedure whereby recesses such as grooves or defined embossed areas are created in the linoleum sheet and then filled with the patterning material. Furthermore, the elevated locations in the linoleum sheet may be coated partially or entirely with the patterning material to form a sheet.

The stack of sheets is usually deposited on a suitable substrate after being calendered, with single-layer and multilayer structures being possible. As a rule, the substrate consists of a woven fabric, e.g., made of jute, glass fibers, metal or synthetic fibers. As described in DE 199 10 389 A1, the substrate may, if desired, be selected so that it can be removed from the completely ripened linoleum sheeting essentially without leaving a residue after the usual ripening of the linoleum sheeting.

The stack of sheets is rolled out by conventional methods known in the field, preferably by calendering. When using calendering, the calender rolls are kept at the temperature usually used for the production of linoleum sheeting. The temperature of the calender roll facing the wear layer of the linoleum sheeting (top calender roll) is lower than the temperature of the calender roll facing the bottom side, i.e., the substrate side of the linoleum sheeting (bottom calender roll).

After rolling out the tiled stack of sheets, the patterned linoleum sheeting thereby formed is subjected to a ripening step in the usual manner. Then, if desired, a surface coating, a dispersion based on acrylate or polyurethane, is applied to the aged linoleum sheeting.

It has surprisingly been found that a novel pattern can be produced at the surface of the linoleum sheeting when using the inventive method, e.g., when using a green linoleum completely coated at its surface with the non-linoleum material.

In this context, it was especially surprising that an interrupted marbleized surface structure was obtained even if the green linoleum was coated with the non-linoleum material over its entire surface. The same thing is also true of the case in which a flat layer is applied only to the area (approximately half of the green linoleum) of the green linoleum which is in the calendering direction, and also the case when linear or meandering grooves are provided in the green linoleum, e.g., the calendering direction of the green linoleum, so that the grooves run essentially across the calendering direction in the subsequent calendering of the stack of sheets consisting of green linoleum cut into pieces and rotated 90°.

Furthermore the present invention provides a patterned linoleum sheeting obtainable by the method according to this invention.

The linoleum sheeting obtainable by the inventive method has the patterning non-linoleum material that is applied to the green linoleum in a non-homogeneous irregularly distributed manner that is characteristic of the inventive method. Without being restricted to the following explanations, it is assumed that the non-linoleum material is essentially present throughout the entire cross section of the finished linoleum sheeting in interrupted structures, e.g., layered structures, after the stack of sheets has been passed through a calender gap. At the surface of the patterned linoleum sheeting obtainable by the inventive method, an interrupted marbleized structure is discernible superimposed on a pattern structure optionally already obtainable by conventional measures, depending on the type of non-linoleum material applied to the green linoleum.

To illustrate the surface structures that are surprisingly producible by the method according to this invention, reference is made to the following figures. The patterned linoleum sheeting illustrated in FIGS. 3 through 6 was formed by calendering a stack of sheets of tiled green linoleum coated in different ways and stacked layer upon layer.

Figure 3:
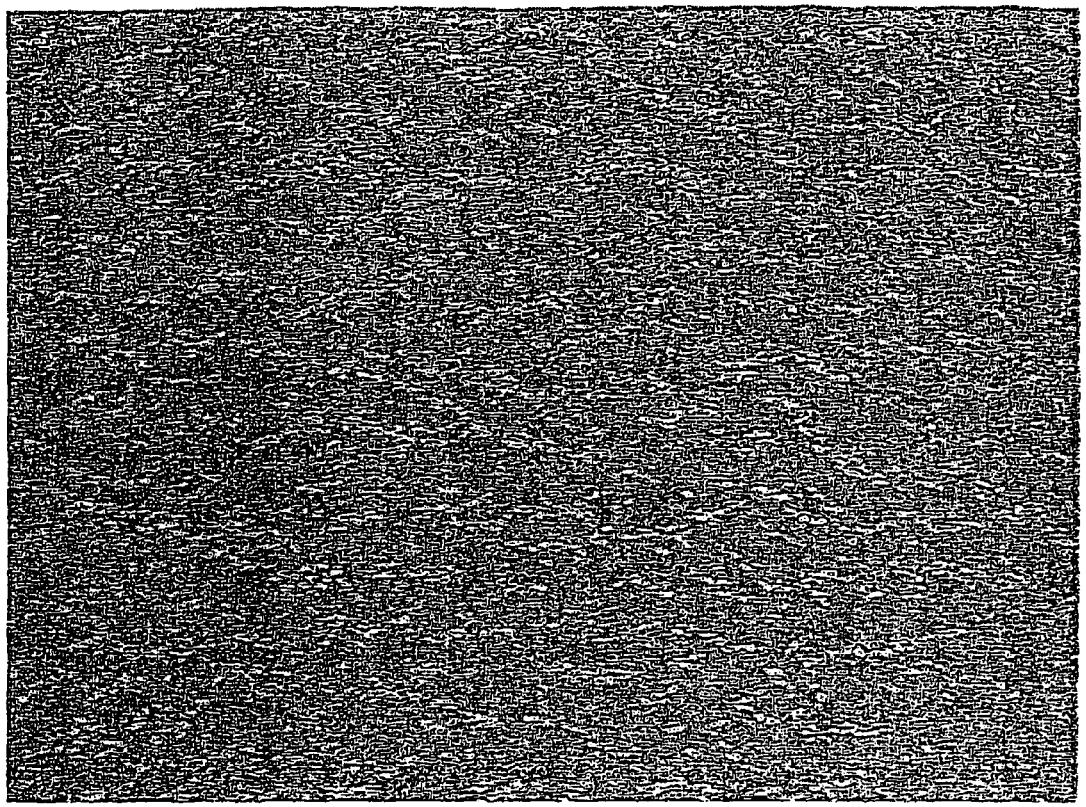
FIGS. 3 through 7 show patterned linoleum sheeting that can be produced by the inventive method.

FIG. 3 illustrates a patterned linoleum sheeting produced as described above, whereupon a single-color green linoleum has been coated over the full area with an effect paste consisting of polyester-mica with a substrate based on a water-based cellulose derivative.

Figure 4:
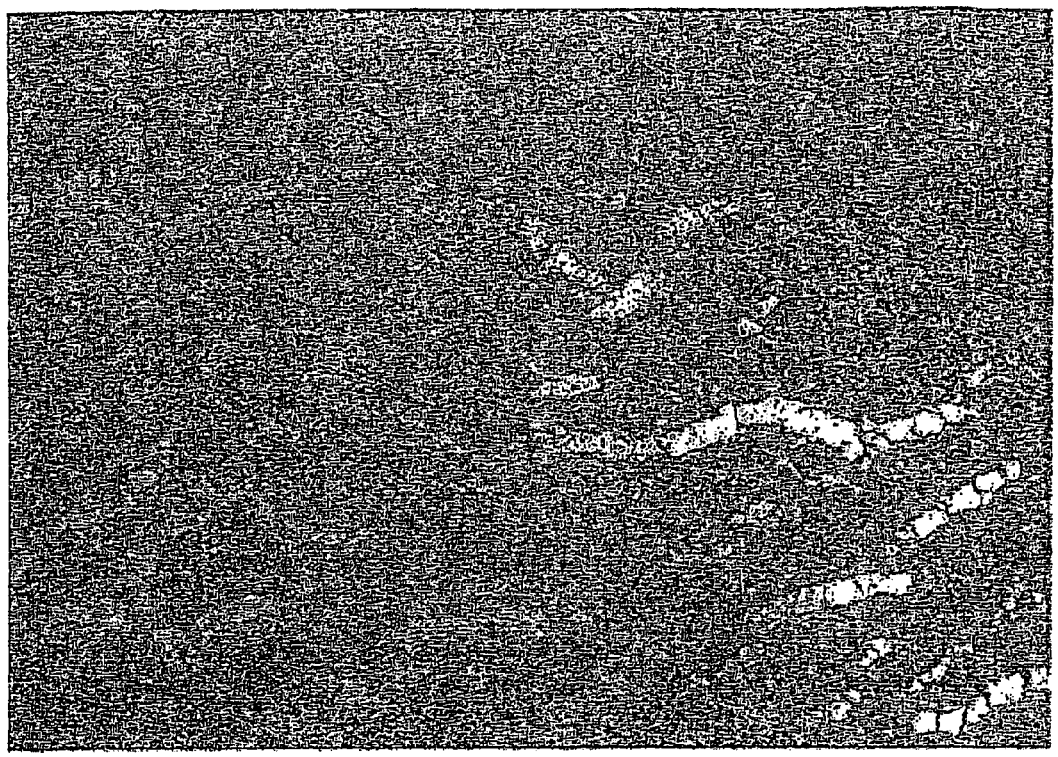

FIG. 4 illustrates a patterned linoleum sheeting produced as described above, using a multicolor green linoleum having grooves arranged across the direction of calendering and filled with an aluminum paste.

Figure 5:
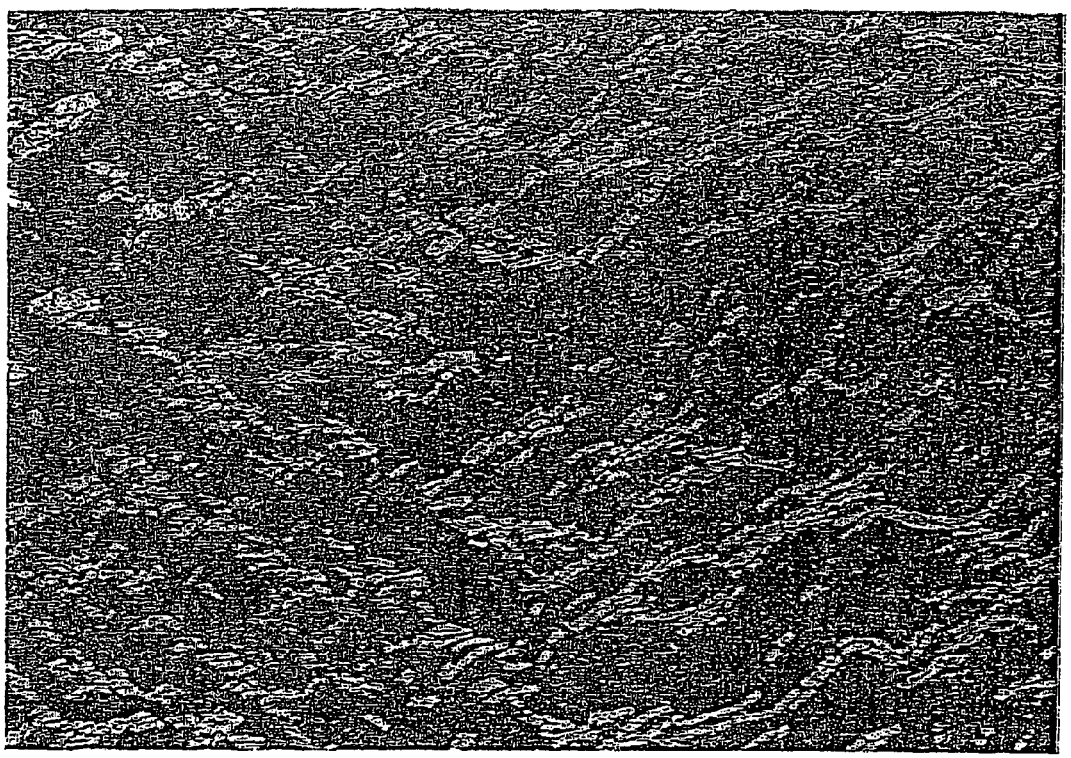

FIG. 5 illustrates a patterned linoleum sheeting produced as described above, a green linoleum having grooves arranged across the direction of calendering, spaced a distance of approximately 0.5 mm apart, having a groove depth of approximately 0.5 mm and a width of approximately 0.5 mm. This green linoleum was coated with an aluminum paste over the entire surface and then calendered.

Figure 6:
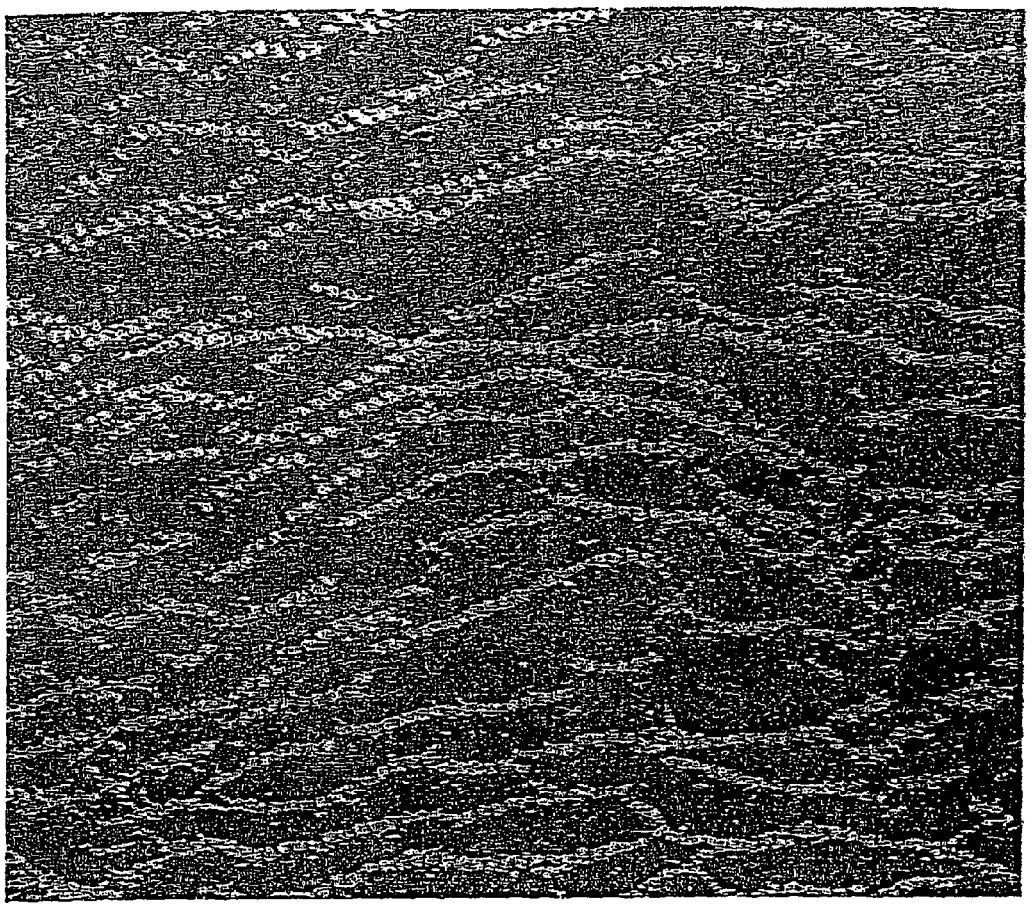

FIG. 6 illustrates a patterned linoleum sheeting produced as illustrated in FIG. 4, a single-color green linoleum being furnished with dot-shaped recesses, whereby the dot-shaped recesses have a diameter of approximately 0.5 mm, a spacing from one another of approximately 0.5 mm and a depth of approximately 0.5 mm. The green linoleum was coated with an aluminum paste over the entire surface, thereby filling up the dot-shaped recesses. The coated green linoleum pieces layered one above the other as a stack of sheets were then calendered.

Figure 7:
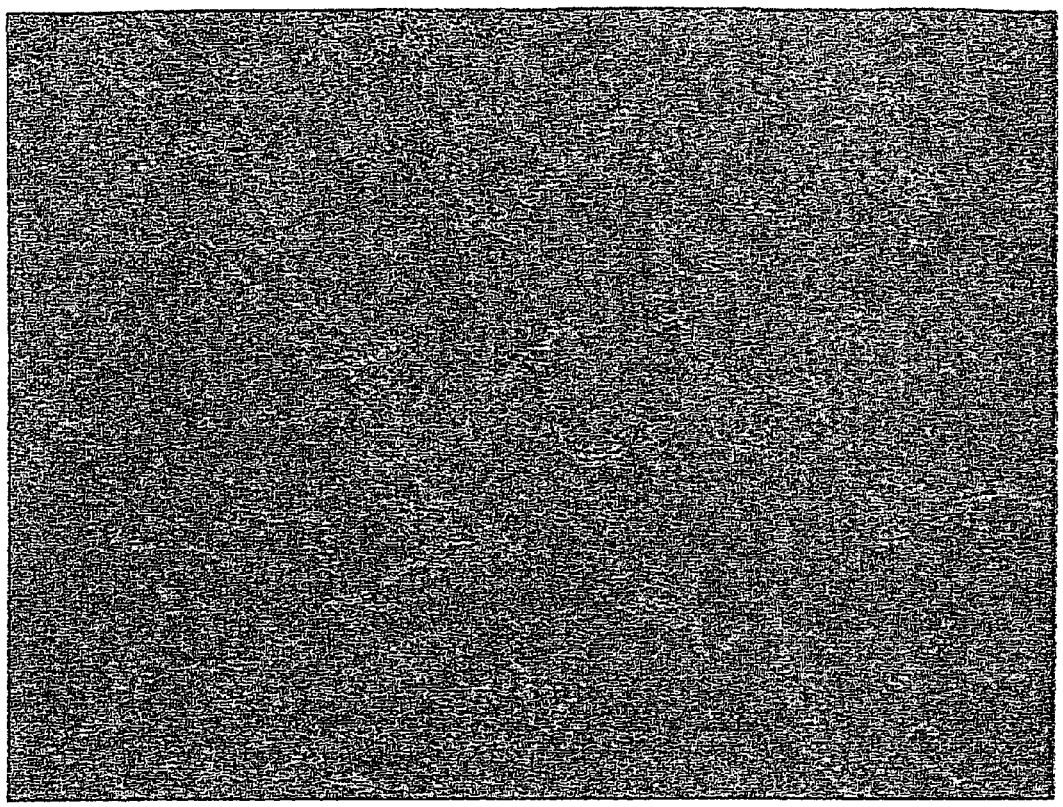

FIG. 7 illustrates a patterned linoleum sheeting produced as described above, where a multicolor green linoleum has been produced from a scraped linoleum mixture. The green linoleum was furnished with interrupted irregular grooves in its calendering direction over a width of approximately 30 cm and then the green linoleum was coated over the full surface with an aluminum paste based on a dispersion, completely filling the grooves. Then the green linoleum was cut into pieces, each of which was then rotated 90° and layered like tiles to form a stack of sheets and then calendered again.

As shown clearly in the figures, even after a stack of sheets comprising green linoleum coated over the full surface, no surface layer covered with non-linoleum material is formed over essentially the entire surface but instead, surprisingly, a novel interrupted patterned structure is formed. The design of this unexpected patterning at the surface of the finished linoleum sheeting appears to be attributed to random unforeseeable mixing processes in the calender gap during calendering.

FIG. 8 shows a schematic view of a device for implementing another preferred embodiment of the inventive method. In contrast with the embodiment illustrated in FIG. 2, a hot-melt material containing the non-linoleum material is applied to the bottom side of the green linoleum through a hot-melt coater 9 situated beneath the cold roller of the sheet calender 1. The other working steps are performed as illustrated in FIG. 2.

In addition, the present invention relates to the use of a linoleum sheeting that can be produced by the inventive method as a floor covering, as tiles, as wall covering or decorative covering.

Other plastic materials conventionally used to produce sheeting (in particular floor covering) may also be used instead of linoleum in the inventive method described above. Those skilled in the art will be aware of suitable plastic materials. Examples include plastics based on PVC, polyolefin, EVA, polyacrylate or rubber. When using the plastics mentioned above, patterned sheeting based on, for example, PVC, polyolefin, EVA, polyacrylate or rubber can be produced, this sheeting having a novel design at the surface.

The present invention will be explained further by the following examples which are not restrictive.

EXAMPLE 1

Producing a Prototype of a Patterned Linoleum Sheeting

First, a single-color green linoleum is produced from a scraped linoleum mixture on a pilot plant roll mill in a thickness of approximately 2 mm.

The green linoleum is coated over the entire area with an effect paste containing a polyester-mica and having a water-based cellulose derivative as the substrate with a Moltopren foam rubber roller.

After drying briefly, the green linoleum is cut into eight pieces of equal size which are then stacked one above the other, the resulting stack of sheets is pressed and heated. The thickness of the stack of sheets is approximately 16 mm. This stack of sheets is calendered using a laboratory roll mill, whereby the direction of travel of the stack of sheets is across the direction of travel of the green linoleum. The thickness of the resulting linoleum sheeting which is illustrated in FIG. 3 amounts to approximately 2 mm.

EXAMPLE 2

Producing a Prototype of a Patterned Linoleum Sheeting

A linoleum sheeting was produced by the same method as described in Example 1 with the following differences.

A multicolor green linoleum was furnished with continuous grooves pointing in the calendering direction over its entire width by using a scratching tool. The groove spacing was set at approximately 5 mm, the groove depth at approximately 0.5 mm and the groove width at approximately 1 mm.

The grooves were filled with a rubber doctor using an aluminum paste based on a dispersion.

The green linoleum was processed further to form a linoleum sheeting in the same way as described in Example 1. The resulting linoleum sheeting is illustrated in FIG. 4. It can be seen clearly that the patterned structure resulting from the aluminum paste (the corrugated light areas) is superimposed on the marbleized structure (the fine dark zones) resulting from the multicolor linoleum mixture.

EXAMPLE 3

Producing a Prototype of a Patterned Linoleum Sheeting

In the same manner as described in Example 1, a single-color green linoleum was produced. This green linoleum was furnished with interrupted grooves arranged irregularly and aligned in the calendering direction of the green linoleum over its entire width. The groove spacing was set at approximately 0.5 mm and the groove depth at approximately 0.5 mm with the groove width at approximately 0.5 mm.

The grooves were completely filled with an aluminum paste based on a dispersion using a rubber doctor and in addition the elevated locations in the green linoleum were completely coated with the same aluminum paste.

The green linoleum was then processed further in the same manner as described in Example 1 to yield a linoleum sheeting as illustrated in FIG. 5.

EXAMPLE 4

Producing a Prototype of a Patterned Linoleum Sheeting

A single-color green linoleum was produced in the same way as described in Example 1. This green linoleum was furnished with dot-shaped recesses by means of an embossing roller over the entire width. The diameter of the dots was set at approximately 0.5 mm, the dot spacing was approximately 0.5 mm and the dot depth was approximately 0.5 mm.

The dot-shaped recesses were completely filled with an aluminum paste based on the dispersion using a rubber doctor and the green linoleum was additionally coated with the same aluminum paste on the elevated area over the entire surface. The green linoleum was then processed further in the same way as shown in Example 1 to form a linoleum sheeting as illustrating in FIG. 6.

EXAMPLE 5

Producing a Floor Covering from a Patterned Linoleum Sheeting

First, a multicolored linoleum sheeting was produced from a multicolored scraped linoleum mixture by calendering in a width of approximately 160 cm and a thickness of approximately 1.8 mm.

The green linoleum was furnished with interrupted irregular grooves on its top side in a calendering device in a width of approximately 30 cm from its edge using a scraping tool. The groove spacing was set at approximately 0.5 mm, the groove depth at approximately 0.5 mm and the groove width at approximately 0.5 mm. The resulting green linoleum was coated over the full surface with a paste based on a dispersion containing aluminum powder using a rubber doctor, completely filling up the grooves.

After drying briefly, the green linoleum was cut into sections approximately 2 m in length, each section was rotated 90° and stacked to form a tiled stack of sheets. In doing so, the edge of the pieces of green linoleum furnished with grooves would stand out in the direction of the calender in subsequent calendering, with the filled grooves and the coated surface of the green linoleum pieces facing upward. In the subsequent calendering, the grooves were aligned across the direction of calendering. The stack of sheets consisting of tiled pieces of green linoleum layered one above the other was heated and pressed, resulting in a stack of sheets having a thickness of approximately 30 mm, corresponding approximately to 16 times the thickness of the green linoleum. This compressed stack of sheets was then calendered to form linoleum sheeting with a thickness of approximately 1.5 mm.

This linoleum sheeting is used as the linoleum top sheet, i.e., the top layer of a linoleum floor covering.

A floor covering backing was produced separately on a separate roll mill by rolling (calendering) a linoleum mixture onto a jute cloth backing. The backing had a thickness of approximately 1 mm.

In a further step, the linoleum top sheet and the backing were joined together in a frictionally connected manner by a so-called belt calender. FIG. 7 shows the pattern structure on the surface of the resulting linoleum sheeting, namely in this case a linoleum floor covering.

What is claimed is:

1. Method for producing a patterned linoleum sheeting, comprising the steps:
    (a) Applying a flat layer of a non-linoleum material, in the form of a solution, paste, suspension or dispersion, which is different from the raw materials used for the production of a linoleum mixture to at least portion of the surface of a green linoleum and/or introducing a non-linoleum material, in the form of a solution, paste, suspension or dispersion, which is different from the raw materials used for the production of a linoleum mixture into predetermined recesses in the green linoleum,
    (b) Cutting the resulting green linoleum into pieces of a predetermined length,
    (c) Layering the cut green linoleum pieces to form a tiled stack of sheets and
    (d) Calendering the tiled stack of sheets to form patterned linoleum sheeting,
    wherein the non-linoleum material is a metallic material and/or a pigment that differs from the pigment(s) optionally used for coloring the linoleum mixture.

2. Method for producing a patterned linoleum sheeting, comprising the steps:
    (a') Applying a non-linoleum material, in the form of a solution, paste, suspension or dispersion, which is different from the raw materials used for the production of a linoleum mixture to a scraped linoleum mixture and calendering the scraped linoleum mixture furnished with the non-linoleum material to form a green linoleum or a finished linoleum sheeting,
    wherein the non-linoleum material is a metallic material and/or a pigment that differs from the pigment(s) optionally used for coloring the linoleum mixture.

3. The method as claimed in claim 2, wherein the green linoleum obtained in step (a') is processed further by:
    (b) Cutting the resulting green linoleum into pieces of a predetermined length,
    (c) Layering the cut green linoleum pieces to form a tiled stack of sheets and
    (d) Calendering the tiled stack of sheets to form a patterned linoleum sheeting.

4. The method as claimed in claim 2, wherein after step (a'), a flat layer of a non-linoleum material is applied to at least part of the surface of this green linoleum and/or a non-linoleum material is introduced into predetermined recesses in this green linoleum.

5. The method as claimed in claim 1, wherein the non-linoleum material is a metal powder, a metal paste, an effect pigment, a luster pigment or a pearlescent effect pigment.

6. The method as claimed in claim 1, wherein the non-linoleum material is an aluminum powder, an aluminum paste or an effect pigment based on mica or mica minerals or a polyester-mica.

7. The method as claimed in claim 1, wherein the non-linoleum material is applied as a flat layer to the entire width or only a portion of the green linoleum and/or is introduced into predetermined groove-like recesses which are present over the entire width or only a portion of the width of the green linoleum.

8. The method as claimed in claim 1, wherein the flat layer is applied to the green linoleum in a thickness of 5 µm to 1000 µm.

9. The method as claimed in claim 1, wherein the recesses in the green linoleum have a depth in the range of 5% to 60%, based on the thickness of the green linoleum.

10. Method for producing a patterned linoleum sheeting, comprising the steps:
    Producing a single-color or multicolor green linoleum from a linoleum mixture,
    Coating the single-color or multicolor green linoleum with a non-linoleum material, in the form of a solution, paste, suspension or dispersion, which is different from the raw materials used for the production of a linoleum mixture over at least a portion of its surface,
    Processing the coated green linoleum to form granules or chips either immediately or after being cut into preferably approximately equally large halves in the calendering direction with the resulting sections then being layered one above the other or folding the green linoleum once or several times,
    Producing a linoleum sheet from the resulting granular particles or chips by calendering same and optionally Further processing the resulting linoleum sheet in the usual way to form a final linoleum sheeting,
wherein the non-linoleum material is a metallic material and/or a pigment that differs from the pigment(s) optionally used for coloring the linoleum mixture.

11. The method as claimed in claim 10, wherein the non-linoleum material is a metallic material or a pigment that differs from the pigment(s) optionally used for coloring the linoleum mixture.

12. The method as claimed in claim 10, wherein the non-linoleum material is a metal powder, a metal paste, an effect pigment, a luster pigment or a pearlescent effect pigment.

13. The method as claimed in claim 10, wherein the non-linoleum material is an aluminum powder, an aluminum paste, an effect pigment based on mica or mica materials or a polyester-mica.

14. The method as claimed in claim 2, wherein the non-linoleum material is a metallic material and/or a pigment that differs from the pigment(s) optionally used for coloring the linoleum mixture.

15. The method as claimed in claim 4, wherein the non-linoleum material is a metallic material and/or a pigment that differs from the pigment(s) optionally used for coloring the linoleum mixture.

16. The method as claimed in claim 2, wherein the non-linoleum material is a metal powder, a metal paste, an effect pigment, a luster pigment or a pearlescent effect pigment.

17. The method as claimed in claim 4, wherein the non-linoleum material is a metal powder, a metal paste, an effect pigment, a luster pigment or a pearlescent effect pigment.

18. The method as claimed in claim 2, wherein the non-linoleum material is an aluminum powder, an aluminum paste or an effect pigment based on mica or mica minerals or a polyester-mica.

19. The method as claimed in claim 4, wherein the non-linoleum material is an aluminum powder, an aluminum paste or an effect pigment based on mica or mica minerals or a polyester-mica.

20. The method as claimed in claim 2, wherein the non-linoleum material is applied as a flat layer to the entire width or only a portion of the green linoleum and/or is introduced into predetermined groove-like recesses which are present over the entire width or only a portion of the width of the green linoleum.

21. The method as claimed in claim 4, wherein the non-linoleum material is applied as a flat layer to the entire width or only a portion of the green linoleum and/or is introduced into predetermined groove-like recesses which are present over the entire width or only a portion of the width of the green linoleum.

22. The method as claimed in claim 4, wherein the flat layer is applied to the green linoleum in a thickness of 5 µm to 1000 µm.

23. The method as claimed in claim 4, wherein the recesses in the green linoleum have a depth in the range of 5% to 60%, based on the thickness of the green linoleum.

* * * * *